United States Patent [19]
Slingluff

[11] Patent Number: 5,980,668
[45] Date of Patent: Nov. 9, 1999

[54] TIRE WITH ROTATION TIME TREAD WEAR INDICATOR

[75] Inventor: Mark D Slingluff, North Canton, Ohio

[73] Assignee: Kumho & Co, Inc, Kwangju, Rep. of Korea

[21] Appl. No.: 08/660,909

[22] Filed: Jun. 10, 1996

[51] Int. Cl.⁶ .............................. B29D 30/00; B60C 11/24
[52] U.S. Cl. .................... 156/110.1; 29/402.03; 29/426.1; 152/154.2; 152/523; 152/DIG. 12
[58] Field of Search ................. 152/151, 154.2, 152/450, 523, 525, DIG. 12; 156/110.1; 29/402.03, 426.1

[56] References Cited

U.S. PATENT DOCUMENTS

| | | | |
|---|---|---|---|
| H1283 | 2/1994 | Porto et al. ........................... | 152/154.2 |
| 2,102,784 | 12/1937 | Bridges ................................ | 152/154.2 |
| 2,706,509 | 4/1955 | White .................................. | 152/154.2 |
| 3,516,467 | 6/1970 | Sims ................................... | 152/154.2 |
| 3,833,040 | 9/1974 | Bins .................................... | 152/154.2 |
| 3,909,906 | 10/1975 | MacMillan ............................ | 152/353 |
| 4,144,921 | 3/1979 | Yabuta et al. ........................ | 152/353 R |
| 4,226,274 | 10/1980 | Awaya et al. ........................ | 152/154.2 |
| 4,641,696 | 2/1987 | Semin et al. ........................ | 152/209 R |
| 5,211,779 | 5/1993 | Tomioka ............................. | 152/209 R |
| 5,257,446 | 11/1993 | Steves et al. ....................... | 29/402.03 |
| 5,303,756 | 4/1994 | Hill ..................................... | 152/154.2 |

FOREIGN PATENT DOCUMENTS

| | | | |
|---|---|---|---|
| 250113 | 12/1987 | European Pat. Off. ............ | 152/154.2 |
| 2457334 | 6/1975 | Germany ............................ | 152/154.2 |
| 3627832 | 2/1988 | Germany ............................ | 152/154.2 |
| 110608 | 8/1980 | Japan ................................. | 152/154.2 |
| 4-129808 | 4/1992 | Japan ................................. | 152/154.2 |
| 2265586 | 10/1993 | United Kingdom ................ | 152/154.2 |

Primary Examiner—Steven D. Maki
Attorney, Agent, or Firm—Paul E Milliken; Lee A Germain

[57] ABSTRACT

A vehicle tire having a rotation time wear indicator associated with the tire tread which visually shows when the tire tread has worn to various levels at which levels the tire should be rotated to a different wheel position on a vehicle. The wear indicator is a plurality of pattern parts such as holes, raised portions in tread grooves or other distinctive patterns in the tread which are positioned at various radial levels of the tread with the different levels being spaced apart at different locations around the circumference of the tread. When the tread wear reaches various levels relative to the levels of the pattern parts, so that any particular pattern part is no longer visible, then it is time to rotate the tire to another wheel position.

8 Claims, 3 Drawing Sheets

TIRE WITH ROTATION TIME TREAD WEAR INDICATOR

FIELD OF THE INVENTION

This invention relates to a vehicle tire having a rotation time indicator and more specifically relates to a wear indicator in the tread formed of a plurality of pattern parts such as radially extending holes or the like located at different radial levels in the tire tread, which pattern parts disappear at various intervals of tire wear which coincide with the wear levels at which the tire should be rotated from one wheel location on the vehicle to another location.

BACKGROUND OF THE INVENTION

Various different types of tire tread wear indicators are known in the prior art to indicate when a tread has worn to a level where the tire is no longer safe for use. On such tread wear indicator is shown in U.S. Pat. No. 5,303,756 issued to J L Hill which shows the use of wear indicating members in the shape of pins or pegs molded in the tread material adjacent the inner surface of the tread. These members are made in a color contrasting to the color of the tread so that as the tread wears to a certain level the wear indicators become visible. U.S. Pat. No. 4,226,274 issued to H Y Awaya, et al. shows another example of the use of contrasting colored indicia embedded in the tread to indicate the amount of tread remaining and when the tread has worn to an unsafe level. Likewise U.S. Pat. No. 3,516,467 issued to C D Simms shows a tire tread having annular ribs of a contrasting colored material embedded at the radially inner portion of the tread in such a position that when the tread wears to a certain depth, the ribs become visible. A similar concept is shown in U.S. Pat. No. 3,833,040 issued to C G Bins. U.S. Statutory Invention Registration No. H1283 shows a tire having plies of contrasting colors to each other and with a bottom ply having a contrasting pattern so that various levels of wear are indicated by the different colored plies and the bottom ply serves as a warning of an unsafe condition. U.S. Pat. No. 2,706,509 issued to E J White indicates various levels of tire wear by means of stepped surfaces located in the voids or grooves between adjacent ribs of a tire. This indicator will show for example of whether the tread is worn one-forth, one-half or to some other level for the purpose of providing a price adjustment on a tire which may fail before the tread is fully worn.

While the above described tread wear indicators may function as various levels of effectiveness for the purposes for which they were designed, none of the above wear indicators was designed for the purpose of indicating when a tire should be rotated from one wheel location to another on a vehicle to compensate for any uneven tread wear and extend the life of the tire.

OBJECTS OF THE INVENTION

It is an object of the present invention to provide a simple and effective tread wear indicator for a vehicle tire which will indicate each time the tire tread has worn a sufficient incremental distance that it should be rotated to a different wheel locating on the vehicle.

Another object of the invention is to provide a tire tread wear indicator which is easy to read and interpret what action is required.

A further object of the invention is to provide a tire tread wear indicator which is simple to manufacture and requires no additional special materials that are different in physical composition or color from the tire tread material.

A still further object of the invention is to provide a tire tread wear indicator in which the circumferential location of various portions of the wear indicator is easily located by marking indicia on the buttress area of the tire.

These and other objects of the invention will become more fully apparent as the description proceeds in the following specification and the accompanying drawings.

SUMMARY OF THE INVENTION

This invention is a tire having a rotation time tread wear indicator comprising: a tire body, and a tread surrounding the periphery of the body having a plurality of raised portions and a plurality of depressed portions therebetween, a distinctive visual pattern of separate pattern parts formed in an unworn tread of the tire, the pattern parts positioned at multiple radially spaced levels with respect to the raised and depressed portions of the tire in such an orientation that as the tire tread wears to various levels, the pattern parts disappear sequentially, the variations of the levels of the pattern parts being such that at least one of the pattern parts disappears each time the tire has worn a sufficient amount that the tire should be rotated to a different relative wheel position.

The invention includes a method of rotating a tire to a different vehicle wheel location based upon a determination of each time a sufficient amount of tread wear has occurred that the tire should be rotated, comprising the steps of:

producing a tire having
  a tire body; and
  an unworn tread surrounding the periphery of the body having a plurality of raised portions and a plurality of depressed portions therebetween; a distinctive visual pattern of a plurality of separate groups of circular holes formed in the raised portion of the unworn tread of the tire;
  each group of holes extending downwardly into the raised portions of the tire tread to a common selected depth which is different from the common selected depth of any one of the other of the groups of holes;
  the groups of holes being located at equally spaced positions around the entire circumference of the tire, one group of holes being the shortest depth and each successive group of holes around the circumference progressively increasing an equal amount in depth until reaching a group of holes having the longest depth so that as the tire tread continues to successively wear to a bottom of each group of holes, each group of holes disappears thereby indicating that the tread has worn away an additional increment of tread thickness, each group of holes lying at an equal circumferential distance on the tread from each next adjacent group of
  holes positioned in either circumferential direction therefrom;
providing the tire on a vehicle at a vehicle wheel location and using the tire such that successive groups of holes disappears due to tread wear;
rotating the tire to a different vehicle wheel location on the vehicle each time a successive group of holes disappears due to tread wear.

DESCRIPTION OF THE PREFERRED EMBODIMENTS

Figure 1:
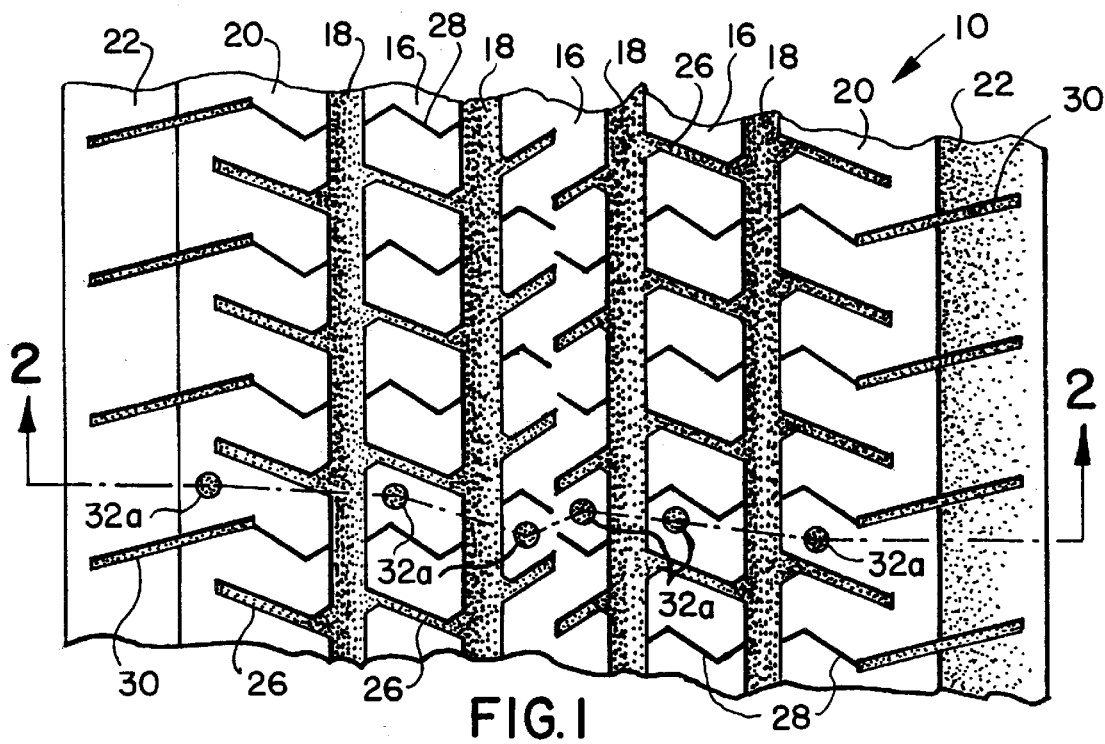
FIG. 1 is a fragmentary plan view of a tire tread showing a primary embodiment of the rotation time tread wear indicator of the invention.
Figure 2:
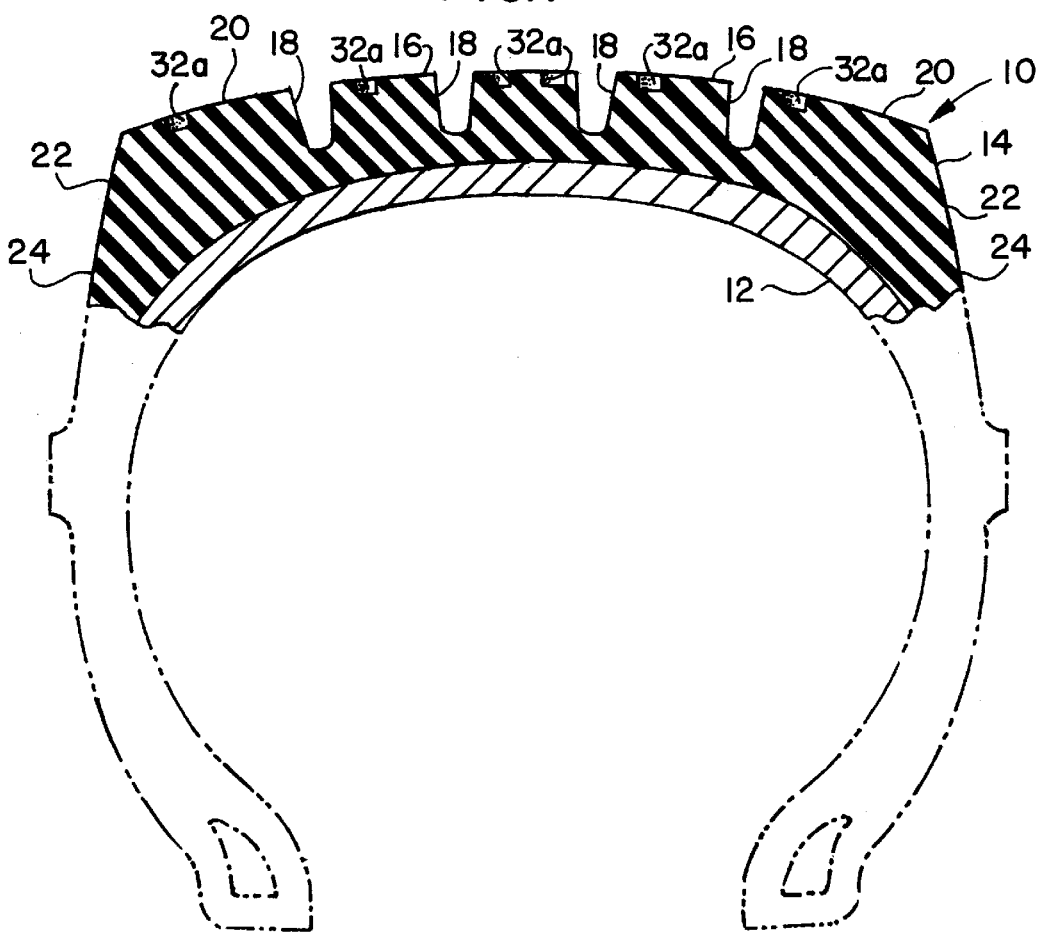
FIG. 2 is a cross-sectional view of the embodiment shown in FIG. 1 taken on line 2—2 of FIG. 1.

Referring now to the drawings and in particular to FIGS. 1 and 2, a tire indicated generally by the numeral 10 has a body 12 circumferentially surrounded by a tread 14. The body may contain any of the conventional reinforcing plies and may be bias ply, radial, belted construction or any combination thereof. Since the tire body construction does not form a part of the invention, for simplicity, it will not be described in further detail.

The tread as shown in FIGS. 1 and 2 has a plurality of circumferential ribs 16 spaced apart by circumferential grooves 18. The tread also has a shoulder rib 20 and a buttress area 22 on each lateral side of the tire which merges with the tire sidewall 24. A series of transverse secondary grooves 26 extend either partially or totally through the ribs at various inclined angles with respect to the ribs. A plurality of blading slots 28 extend across the rigs 16 at various angles. In addition a plurality of grooves 30 extend from the shoulder ribs 20 and into the buttress are 22 on each side of the tire.

A row of holes 32a are shown in the ribs 16 and 20 in FIGS. 1 and 2. This row comprises the holes having the shallowest depth of all the holes in the tire 10. These holes may extend into the rib to a predetermined depth for example such as 0.02" or some other designated depth which would be representative of the amount of tread wear that would occur before time for the first rotation of the tires to a different wheel location on the vehicle.

Figure 3:
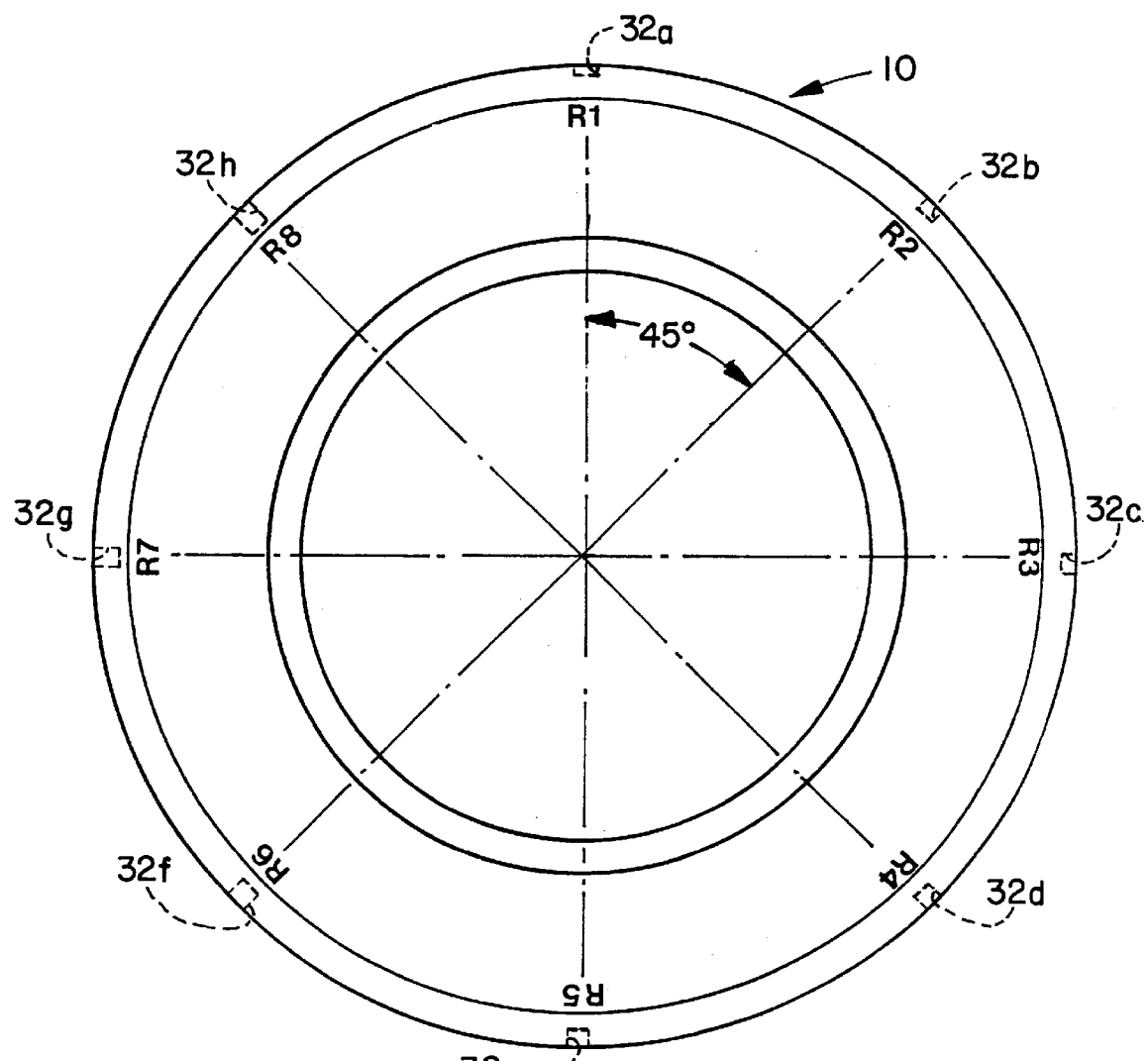
FIG. 3 is a diagrammatic side elevational view of a tire showing the location of indicia and pattern parts of a rotation time tire tread wear indicator of the types shown and described herein.

Referring now to the diagrammatic side elevation of a tire shown in FIG. 3, the tire 10 has a series of indicia identified as R1, R2, R3, R4, R5, R6, R7 and R8 located around the buttress area 22 of the tire at equally spaced angular locations of 45° apart. R1 indicates the location of the row of holes 32a, R2 indicates the next deeper row of holes 32b etc. proceeding in a clockwise direction around the tire with R8 indicating the row of deepest holes 32h which indicates when the last rotation of the tire is due before it is time to replace the tire. As an alternative, the last hole, R8 could be positioned at a depth to indicate when it is time to replace the tire once the outer tread surface wears to a level which is even with the bottom of row R8. The holes starting with 32a at R1 might be 0.02' deep, the holes 32b at R2 might be 0.04' deep and the holes 32c at R3 might be 0.06'. The holes would progressively increase at each successive location around the circumference of the tire.

In operation, each time the tire tread outer circumferential surface wears to a level which is even with each successive level of holes, so that row of holes is no longer visible this indicates that it is time to change the tire to a different wheel location on the vehicle. Position R1 having holes 32a therefore indicates the time for the first rotation when those holes disappear, Position R2 having holes 32b indicate the time for the second rotation when those holes disappear etc. proceeding around the tire until all the rows of holes have disappeared.

Figure 4:
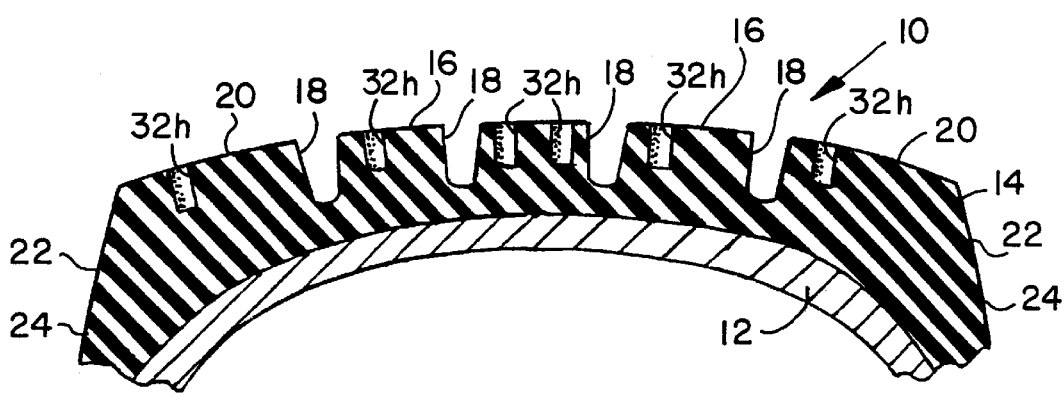
FIG. 4 is a fragmentary cross-sectional view of a tire tread similar to that shown in FIG. 2 but showing deeper tread wear indicator holes than those shown in FIG. 2.

The last and deepest row R8 of holes 32h are shown in FIG. 4 in contrast to the shallow depth of holes 32a shown in FIG. 2. While eight rows of holes have been shown to illustrate the invention, other numbers of rows may be used depending upon the total wear life of the tread ie. Whether the tire wear life is 30,000 miles, 40,000 miles or some other mileage. When other numbers of rows of holes are used they will normally be spaced at equal distances around the circumference of the tire and therefore the angular spacing may vary depending upon the number of rows of holes.

Figure 5:
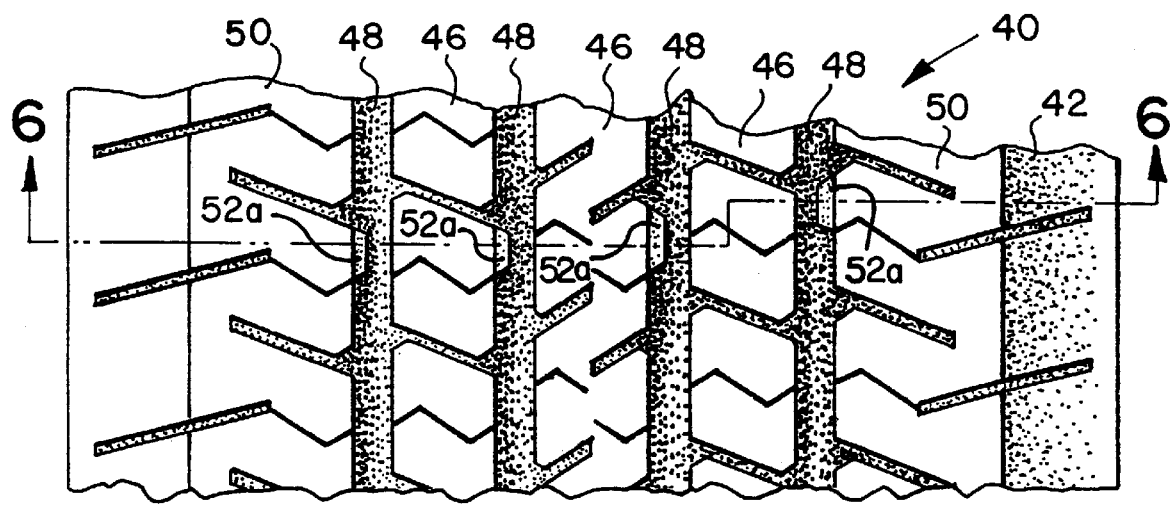
FIG. 5 is a fragmentary plan view of a tire tread similar to that shown in FIG. 1 but showing a different embodiment of the invention having a different configuration of pattern parts which form the tread wear indicator.
Figure 6:
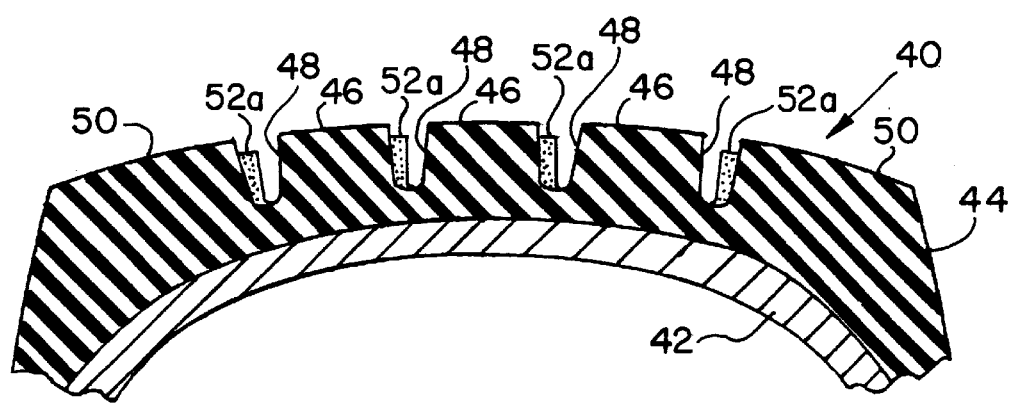
FIG. 6 is a fragmentary cross-sectional view taken on line 6—6 of FIG. 5 and showing the same embodiment of the invention as that shown in FIG. 5.

Another embodiment of the invention is shown in FIGS. 5 and 6 in which a tire 40 has a body 42 and a tread 44 containing ribs 46, grooves 48 and shoulder ribs 50 similar to those shown in FIGS. 1 and 2. The primary difference between this embodiment and the one described previously, is that instead of holes 32a through 32h there are raised portions or ledges 52a through 52h in the grooves 48 positioned against and integral with the ribs 46 and shoulder ribs 50 in a substantially transverse row across the tread. The radial level of each row of raised portions or ledges 52a through 52h progressively varies circumferentially around the circumference of the tire in the same manner as the holes 32a through 32h as previously described. For simplicity only the row of ledges 52a are shown in FIGS. 5 and 6, however by referring to FIG. 3 it can be seen how the radial level or depth of the ledges 32a through 32h can vary so that as the tire tread surface wears until it is level with each successive row of ledges, it is time to change the tire to a different wheel location on the vehicle.

It can be seen that although certain specific hole locations or ledge positions are shown herein for use with this particular tread pattern, various other hole or ledge patterns can be used to be compatible with other tread patterns. It should also be understood that other pattern parts besides the holes and ledges shown herein can also be used to indicate when the tire has worn to a level where it is due for rotation to another wheel position on the vehicle.

These and other modifications can be made in the embodiments show herein without departing from the scope of the invention.

I claim:

1. A tire having a tread wear indicator for visually determining each time a sufficient amount of tread wear has occurred that the tire should be rotated to a different relative wheel location on a vehicle, the tire comprising:

a tire body; and an unworn tread surrounding the periphery of the tire body having a plurality of raised portions and a plurality of depressed portions therebetween;

a distinctive visual pattern of a plurality of separate groups of circular holes formed in the raised portions of the unworn tread of the tire;

each group of holes being spaced apart holes positioned in a line extending substantially transversely across the tread;

each group of holes extending downwardly into the raised portions of the tire tread to a common selected depth which is different from the common selected depth of any one of the other of the groups of holes;

the groups of holes being located at equally spaced positions around the entire circumference of the tire, one group of holes being the shortest depth and each successive group of holes around the circumference progressively increasing an equal amount in depth until reaching a group of holes having the longest depth so that as the tire tread continues to successively wear to a bottom of each group of holes, each group of holes disappears thereby indicating that the tread has worn away an additional increment of tread thickness, each group of holes lying at an equal circumferential distance on the tread from each next adjacent group of holes positioned in either circumferential direction therefrom.

2. A tire as claimed in claim 1 wherein there are 8 groups of holes, each group of holes being spaced 45 degrees from each adjacent group of holes.

3. A tire as claimed in claim 1 wherein marking indicia is located adjacent to each group of holes to indicate which groups of holes have disappeared to thereby indicate which is the most recent group of holes to disappear due to successive tread wear.

4. A tire having a tread wear indicator for visually determining each time a sufficient amount of tread wear has occurred that the tire should be rotated to a different relative wheel location on a vehicle, the tire comprising:

a tire body; and an unworn tread surrounding the periphery of the body having a plurality of ribs and a plurality of grooves therebetween;

a distinctive visual pattern of a plurality of separate groups of circular holes formed in the ribs of the unworn tread of the tire;

each group of holes being spaced apart holes positioned in a line extending substantially transversely across the tread;

each group of holes extending downwardly into the ribs of the tire tread to a common selected depth which is different from the common selected depth of any one of the other of the groups of holes;

the groups of holes being located at equally spaced positions around the entire circumference of the tire, one group of holes being the shortest depth and each successive group of holes around the circumference progressively increasing an equal amount in depth until reaching a group of holes having the longest depth so that as the tire tread continues to successively wear to a bottom of each group of holes, each group of holes disappears thereby indicating that the tread has worn away an additional increment of tread thickness, each croup of holes lying at an equal circumferential distance on the tread from each next adjacent group of holes positioned in either circumferential direction therefrom.

5. A tire as claimed in claim 4 wherein there are 8 groups of holes, each group of holes being spaced 45 degrees from each adjacent group of holes.

6. A tire as claimed in claim 4 wherein marking indicia is located adjacent to each group of holes to indicate which groups of holes have disappeared to thereby indicate which is the most recent group of holes to disappear due to successive tread wear.

7. A method of rotating a tire to a different vehicle wheel location based upon a determination of each time a sufficient amount of tread wear has occurred that the tire should be rotated, comprising the steps of: producing a tire having a tire body; and an unworn tread surrounding the periphery of the body having a plurality of raised portions and a plurality of depressed portions therebetween; a distinctive visual pattern of a plurality of separate groups of circular holes formed in the raised portion of the unworn tread of the tire;

each group of holes extending downwardly into the raised portions of the tire tread to a common selected depth which is different from the common selected depth of any one of the other of the groups of holes;

the groups of holes being located at equally spaced positions around the entire circumference of the tire, one group of holes being the shortest depth and each successive group of holes around the circumference progressively increasing an equal amount in depth until reaching a group of holes having the longest depth so that as the tire tread continues to successively wear to a bottom of each group of holes, each group of holes disappears thereby indicating that the tread has worn away an additional increment of tread thickness, each group of holes lying at an equal circumferential distance on the tread from each next adjacent group of holes positioned in either circumferential direction therefrom;

providing the tire on a vehicle at a vehicle wheel location and using the tire such that successive groups of holes disappears due to tread wear;

rotating the tire to a different vehicle wheel location on the vehicle each time a successive group of holes disappears due to tread wear.

8. The method claimed in claim 7 including the step of providing indicia adjacent each group of holes to indicate which groups of holes have disappeared due to successive tread wear.

\* \* \* \* \*